United States Patent [19]

Matui

[11] Patent Number: 5,987,015
[45] Date of Patent: *Nov. 16, 1999

[54] CODE DIVISION MULTIPLEXING COMMUNICATION SYSTEM AND METHOD

[75] Inventor: Hitosi Matui, Tokyo, Japan

[73] Assignee: NEC Corporation, Japan

[*] Notice: This patent is subject to a terminal disclaimer.

[21] Appl. No.: 08/724,772

[22] Filed: Oct. 3, 1996

[30] Foreign Application Priority Data

Oct. 6, 1995 [JP] Japan .................................. 7-259885

[51] Int. Cl.[6] ...................................................... H04J 13/00
[52] U.S. Cl. ............................................ 370/335; 370/342
[58] Field of Search ..................................... 370/320, 328, 370/329, 335, 342, 441, 479; 375/200, 206, 208, 209, 210, 295, 316, 229, 230, 232

[56] References Cited

U.S. PATENT DOCUMENTS

| | | | |
|---|---|---|---|
| 5,077,753 | 12/1991 | Grau, Jr. et al. | 375/200 |
| 5,144,641 | 9/1992 | Akazawa et al. | 375/208 |
| 5,164,959 | 11/1992 | Cai et al. | 375/200 |
| 5,291,515 | 3/1994 | Uchida et al. | 375/200 |
| 5,583,884 | 12/1996 | Maruyama et al. | 375/207 |
| 5,671,248 | 9/1997 | Chau et al. | 375/208 |

OTHER PUBLICATIONS

M. Fukushi, et al., "Small–Size, High Data Rate Wireless LAN Modem Using Multi Code Direct Sequence (MCDS) Spread Sprectrum", The Institute of Electronics, Information and Communication Engineers, Technical Report of IEICE, RCS94–63 (1994–09), pp. 25–30.

Primary Examiner—Chi H. Pham
Assistant Examiner—Kwang B. Yao
Attorney, Agent, or Firm—Ostrolenk. Faber, Gerb & Soffen, LLP

[57] ABSTRACT

A transmitter 100 comprises a signal distributor 101 for outputting a modulation signal and a selection signal, a code generator 102 for generating a spread code, spread devices 103a to 103d for multiplying the spread code by the modulation signal and a selector 104 for selecting the modulation signal based on the selection signal. A receiver 110 comprises a correlator 112 for taking a correlation between the spread code multiplied by the reception signal and the spread code at a timing of the code generator 102, an equalizer 113 for removing a delay from the signal based on the correlation result, a signal location detector 114 for detecting the location of the signal output by the equalizer 113, a demodulator 115 for demodulating the signal output by the equalizer 113 and a coupler 116 for coupling the signal location information detected by the signal location detector 114 with the signal output by the demodulator 115.

9 Claims, 13 Drawing Sheets

CODE DIVISION MULTIPLEXING COMMUNICATION SYSTEM AND METHOD

BACKGROUND OF THE PRESENT INVENTION

1. Field of the Invention

The present invention relates to a spectrum spread communication system.

2. Description of the Related Art

Figure 12:
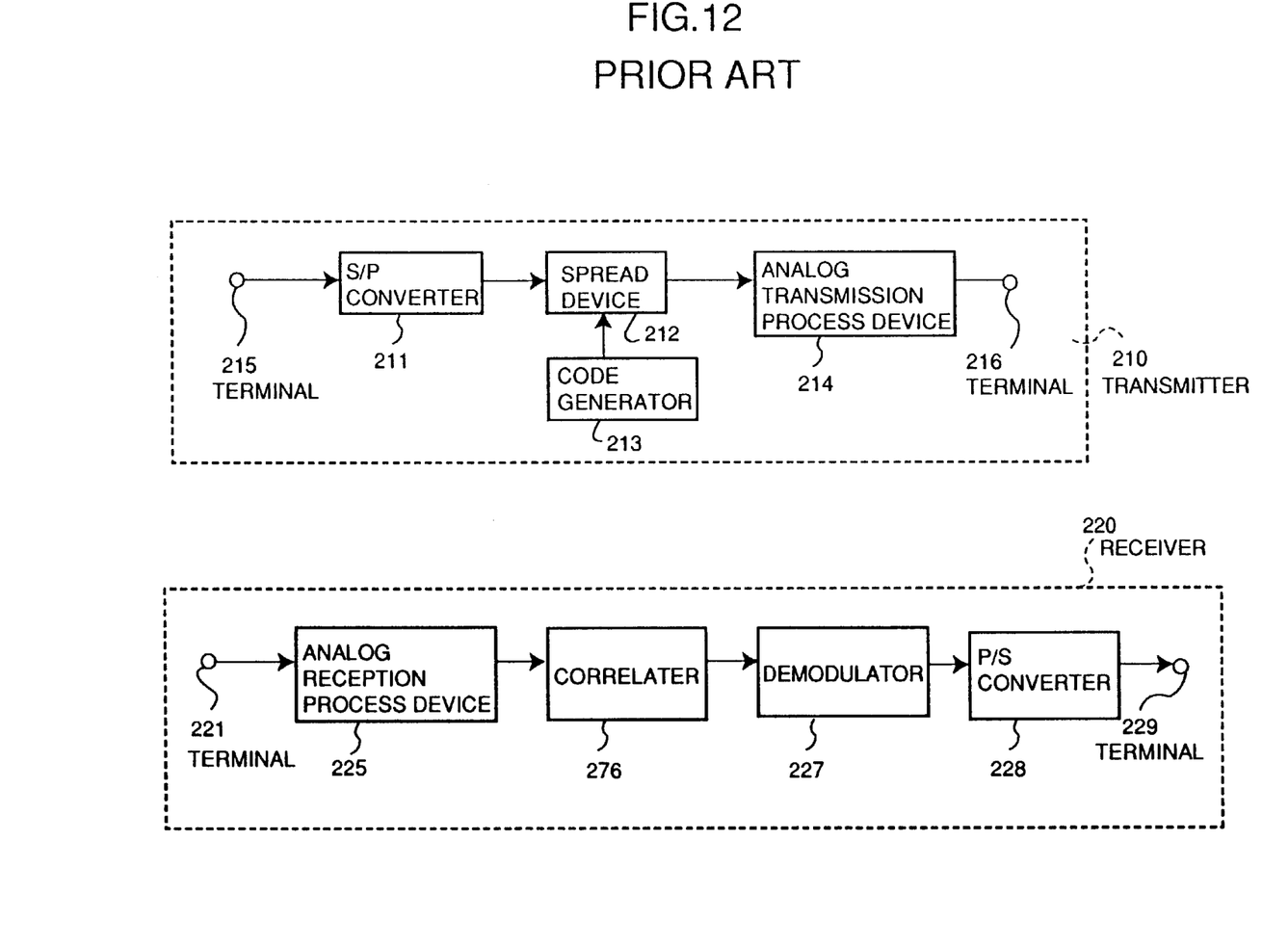
FIG. 12 is a block diagram of a prior art conventional spectrum spread communication system.

FIG. 12 is a block diagram showing an example of a conventional spectrum spread communication system.

The spectrum spread communication system shown in FIG. 12 using a radio LAN constructed to the mode specified by IEEE 802.11.

This prior art shown in FIG. 12 comprises a transmitter 210 for transmitting a predetermined signal and a receiver 220 for receiving the signal transmitted from the transmitter 210. The transmitter 210 is provided with a terminal 215 for receiving an input of serial data, an S/P converter 211 for converting the serial data input from the terminal 215 into parallel data, a code generator 213 for generating a Barker code as a spread code multiplied by the data signal which has been converted by the S/P converter 211, a spread device 212 for multiplying the Barker code by the data signal converted by the S/P converter 211, an analog transmission process device 214 for modulating the data signal multiplied by the Barker code in the spread device 212 and a terminal 216 for transmitting the data signal modulated by the analog transmission process device 214 to the receiver 220. The receiver 220 is provided with a terminal 221 for receiving a data signal transmitted from the transmitter 210, an analog reception process device 225 for amplifying the data signal received by the terminal 221 and converting the data signal into a base band signal, a correlator 226 for taking a correlation between the Barker code multiplied by the data signal converted into the base band signal in the analog reception process device 225 and the Barker code at a timing of the code generator 213 and outputting a data signal based on a resultant correlation, a demodulator 227 for demodulating the data signal output from the correlator 226, a P/S converter 228 for converting the data signal (parallel data) demodulated by the demodulator 227 into serial data and a terminal 229 for outputting the serial data which have been converted through the P/S converter 228.

Figure 13:
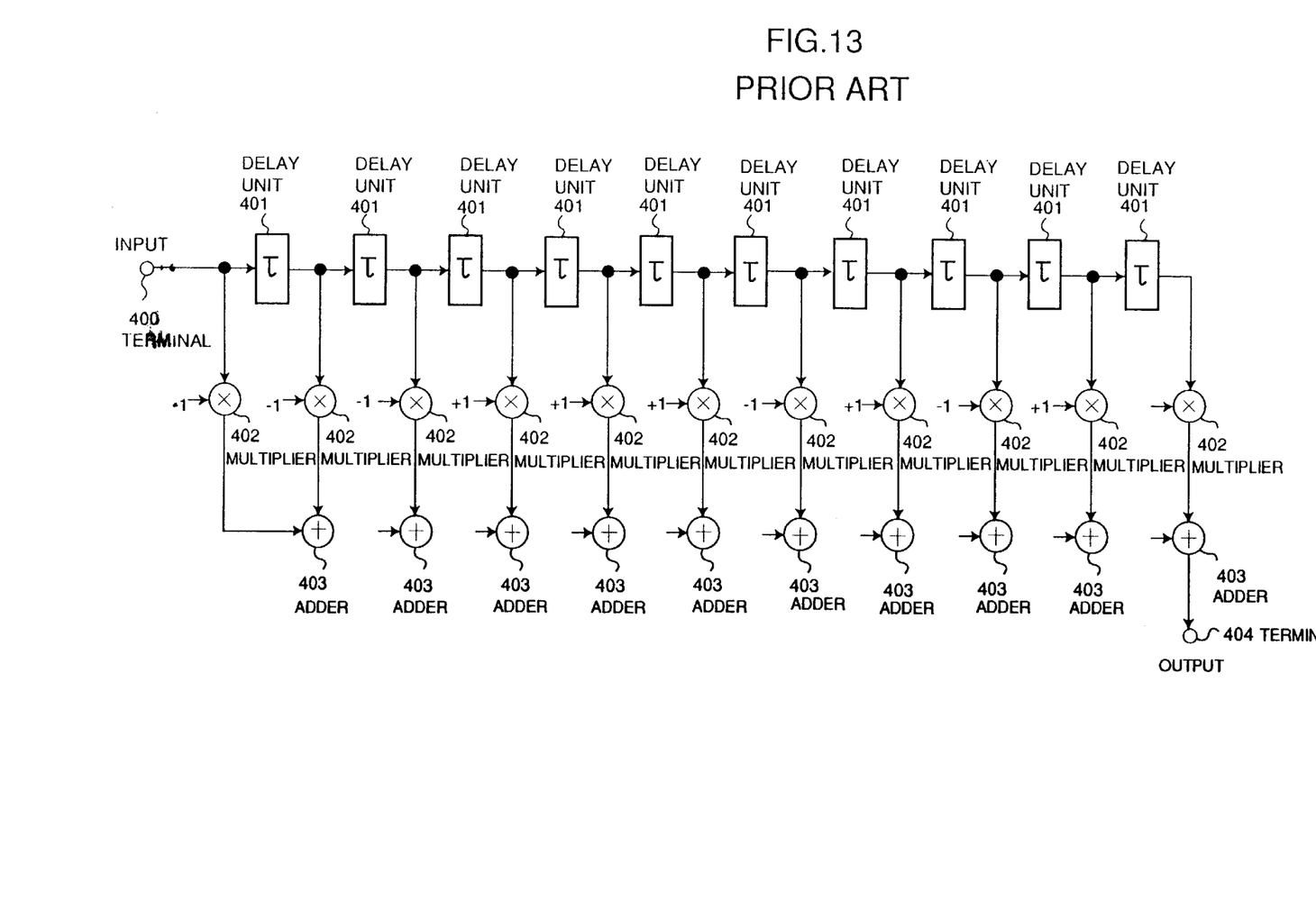
FIG. 13 is a block diagram of a prior art correlator of the conventional spectrum spread communication system shown in FIG. 12.

FIG. 13 is a block diagram showing a construction example of the correlator 226 as shown in FIG. 12.

The prior art correlator shown in FIG. 13 comprises a plurality of delay devices 401 each at a delayed chip rate, multipliers 402 for +/−1 multiplication and adders 403 for addition. Multiplier factors +1 and −1 of the multipliers 402 are identical to the Barker code sequence.

A communication operation of the above-constructed spectrum spread communication system is hereinafter described. It is assumed that a signal transmission rate is at 2 Mbps and an 11-bit Barker code as a spread code is used for the spectrum spread.

When the serial data are input to the terminal 215, the input serial data are converted into parallel data by the S/P converter 211.

A Barker code as a spread code is generated by the code generator 213 which is multiplied by the data signal converted by the S/P converter 211 and then output at a chip rate of 11 MHz.

Then in the spread device 212, the Barker code is multiplied by the data signal which has been converted by the S/P converter 211.

In the analog transmission process device 214, the data signal which has been multiplied by the Barker code in the spread device 212 is modulated for transmission to the receiver 220.

The data signal modulated by the analog transmission process device 214 is transmitted to the receiver 220 via the terminal 216.

The data signal transmitted from the transmitter 210 is received by the receiver 220 via the terminal 221.

The data signal received via the terminal 221 is amplified and converted into a base band signal in the analog reception process device 225.

Then in the correlator 226, a correlation is between the Barker code multiplied by the data signal which has been converted into the base band signal by the analog reception process device 225, and the Barker code at a timing of the code generator 213. Based on the obtained correlation result, the data signal is output.

Output of the correlation result provided by the correlator 226 is hereinafter described.

Figure 14:
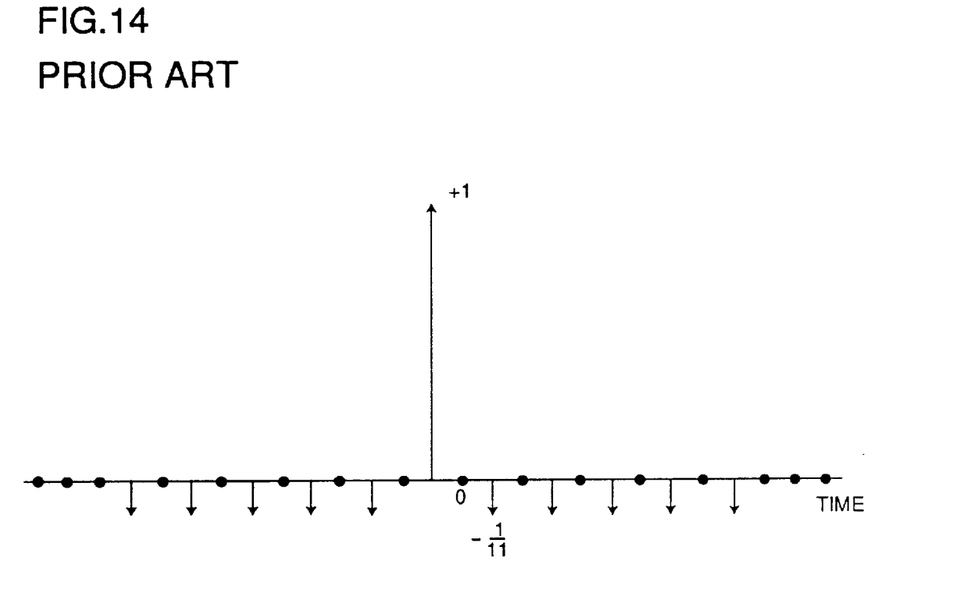
FIG. 14 is of graphically showing an output of a prior art autocorrelation value of the 11-bit Barker code.

FIG. 14 shows an output of the autocorrelation value of the 11-bit Barker code.

Figure 15:
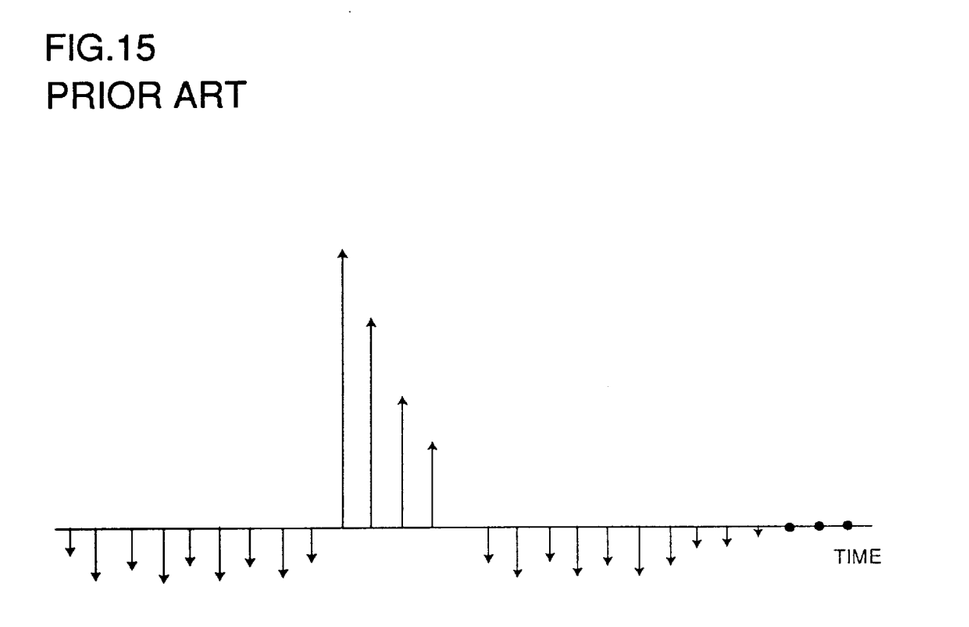
FIG. 15 is a prior art of graphically showing an output signal of a prior art correlator in the presence of the delay distortion.

FIG. 15 shows an output signal of the correlator 226 when delay distortion exists.

When the timing is at 0, the autocorrelation becomes +1. When the timing is not 0, the autocorrelation becomes −1/11 value or zero. A delay wave is generated on the transmission path owing to multipath distortion. As FIG. 15 shows, the delay wave is divided by each chip at every spectrum spread through the spread device 212. The chip signal having the highest correlation value is only extracted in the correlator 226 and the chip signal having low correlation values (i.e., chip signal resulted from the delay wave) is removed. As a result, the distortion resulted from the delay wave is reduced.

After the correlator 226 outputs the data signal based on the correlation result, the demodulator 227 demodulates the data signal. Then the demodulated data signal is converted into serial data by the P/S converter 228.

Finally the converted serial data are output from the terminal 229.

In order to increase the transmission rate in the conventional spectrum spread communication system, the symbol rate is required to be increased or the number of bits added per symbol is required to be increased. These processes for increasing the transmission rate have the following problems.

(1) Increasing the symbol rate:

The spread ratio is specified to be set to 10 times or more in an ISM band at 2.4 GHz in Japan. Additionally the band width is limited to 26 MHz. So the symbol rate cannot be doubled or it will exceed the conventional rate.

(2) Increasing added number of bits per symbol:

The added number of bits per symbol can be increased through a demodulation process such as multiphase PSK and QAM instead of QPSK. Accompanied with the increase in the number of bits, a bit error rate is increased under the influence of the delay distortion. The operation process is, thus, required to have higher accuracy for reducing such error. However it is practically and technologically difficult to realize the high accuracy of the operation.

For example, multiplexing the signal to 16-value or more QAM is required to obtain the transmission rate 2 times higher than QPSK. The 16-value QAM requires peak power 10 times more than that required by the QPSK. Also the bit error rate becomes large to the amplitude distortion, thus exerting substantially a heavy load to the device when trying to obtain the same accuracy as that of the QPSK. It becomes susceptible to the distortion on the transmission path, resulting in reduced service area.

SUMMARY OF THE INVENTION

The present invention solves the above problems by providing a technology allowing for spectrum spread communication at an increased transmission rate twice or more than the conventional rate yet at the same spectrum spread ratio and in the same frequency band width as those of the conventional system.

The present invention provides a transmitter for transmitting a digital signal with spectrum spread comprising: signal distribution means for dividing (k+n×m) bit serial input signal per symbol timing to n pieces of m bit parallel signals (each k, m is at least 1 integer, n is at least 2 integer) and outputting j variations of m bit data signals each at a differently shifted timing from the parallel signal and j selection signals for selecting the m bit data signals (j is an integer also $_jC_n \geq 2^k$) ($_jC_n$ is defined as the number of combinations of j signals that can be formed from n bits and equals j!/[(n!)((j−n)!)]); code generation means for generating j spread codes each at a differently shifted timing; j units of spread means for spectrum spreading individually the data signal based on the spread code; selection means for selecting and synthesizing n signals among output signals of the spread means based on the selection is signal; and modulation means for modulating an output signal of the selection means.

The present invention also provides a receiver for receiving a spectrum spread signal comprising: analog operation means for converting a received signal into a base band signal; correlation means for taking a correlation between an output signal of the analog operation means and a spread code and outputting a correlation result signal; equalizing means for removing a delay distortion generated on a transmission path from the correlation result signal and outputting a signal without delay; signal location detection means for detecting timing locations of n signals at the highest level within 1 symbol block from an output signal of the equalizing means and extracting k-bit information from the timing location; n units of demodulation means for demodulating (n×m)-bit signal based on an output signal of the equalizing means and signal location information obtained by the signal location detector; and coupler means for coupling output signals of the n units of demodulation means and an output signal of the signal location detector and outputting (k+n×m)-bit serial signal per symbol.

In the above-constructed invention, the code generator generates a plurality of codes each at a differently shifted timing from a spread code. Code division multiplexing is executed with those codes, allowing communication to have more transmission capacity. Using Barker codes exhibiting excellent self correlating characteristics especially improves transmission characteristics for the code division multiplexing.

The information on timing locations of signals is considered for multiplexing. Therefore the transmission capacity is further expanded.

Since the equalizer removes the delay distortion of the signal generated on the transmission path, a plurality of codes each at a differently shifted timing from the spread code are used during communication operation so as not to be influenced by the delay distortion generated on the transmission path.

BRIEF DESCRIPTION OF THE DRAWINGS

This and other objects, features and advantages of the present invention will become more apparent upon a reading of the following detailed description and drawings, in which.

DETAILED DESCRIPTION OF THE PREFERRED EMBODIMENTS

An embodiment of the present invention is explained referring to the drawings.

Figure 1:
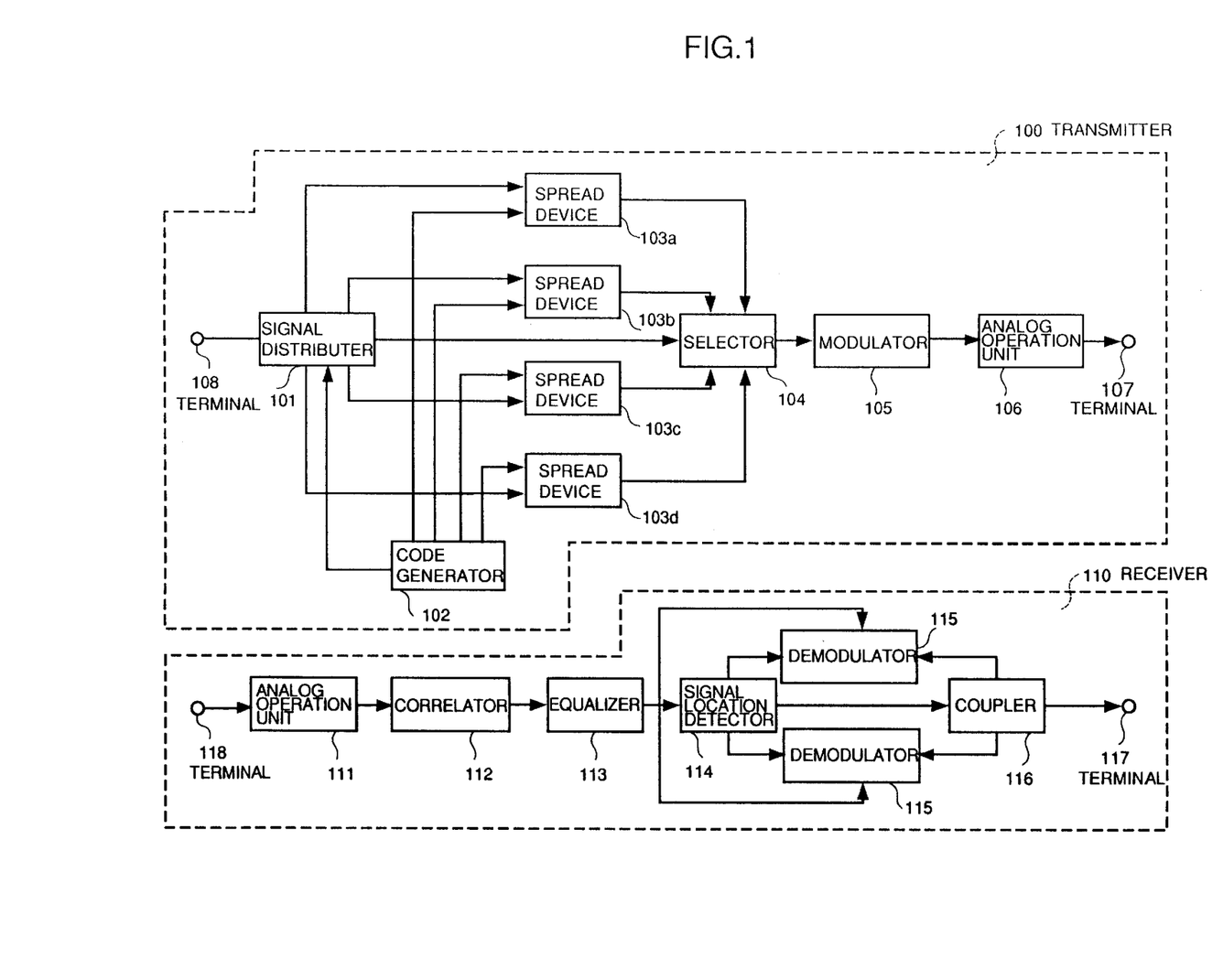
FIG. 1 is a block diagram representing a code division multiplexing communication system of the present invention.

FIG. 1 is a block diagram of a code division multiplexing communication system of this embodiment.

The code division multiplexing communication system of this embodiment comprises a transmitter 100 for transmitting a predetermined signal and a receiver 110 for receiving the signal transmitted from the transmitter 100.

The transmitter 100 further comprises a terminal 108 for receiving an input of a serial signal as the transmission signal and a signal distributor 101 for dividing the serial signal input from the terminal 108 to parallel signals and outputting a data signal and a selection signal. The transmitter 100 comprises a code generator 102 for generating a Barker code as a spread code multiplied by the data signal and 4 units of spread device 103a to 103d each for multiplying the Barker code by the data signal. The transmitter 100 comprises a selector 104 for selecting the data signal which has been spread based on the selection signal and a modulator 105 for modulating the data signal selected by the selector 104. The transmitter 100 further comprises an analog operator 106 for converting the frequency of the modulated signal through the modulator 105 into a radio frequency and a terminal 107 for transmitting the modulated signal which has been frequency converted through the analog operator 106 to a receiver 110.

The receiver 110 comprises a terminal 118 for receiving the data signal transmitted from the transmitter 100 and an analog operator 111 for amplifying the reception signal received by the terminal 118 and converting the amplified reception signal into a base band signal. The receiver 110 comprises a correlator 112 for taking a correlation between the Barker code multiplied by the reception signal which has been converted into the base band signal through the analog operator 111 and the Barker code at a timing in the code generator 102 and for outputting the signal based on the obtained correlation result. The receiver 110 further comprises an equalizer 113 for removing a delay component generated on the transmission path from the signal based on the correlation result provided by the correlator 112 and a signal location detector 114 for detecting a location of the signal output from the equalizer 113. The receiver 110 further comprises a demodulator 115 for demodulating the signal output from the equalizer 113 based on the signal location detected by the signal location detector 114, a coupler 116 for coupling the signal output from the demodulator 115 based on the signal location detected by the signal location detector 114 and a terminal 117 for outputting the signal coupled by the coupler 116 as serial data.

Figure 2:
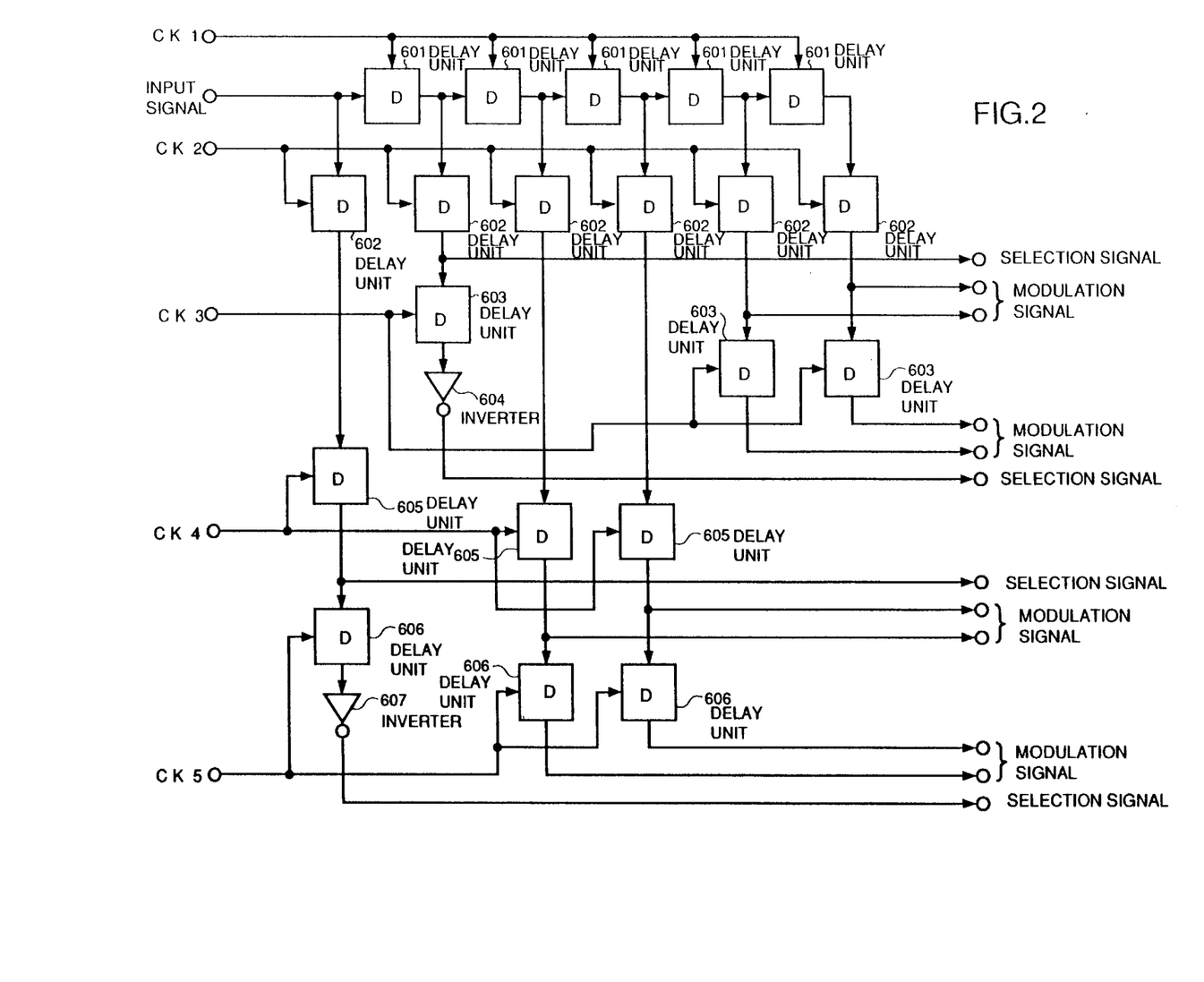
FIG. 2 is a block diagram of a signal distributor 101.

The signal distributor 101 is described in detail. FIG. 2 is a block diagram of the signal distributor 101. The signal distributor 101 of this embodiment that is controlled by clock signals CK1 to CK5 sent from the code generator 102 comprises a plurality of delay units 601, 602, 603, 605 and 606, an inverter 604 for inverting an output of the delay unit 603 and another inverter 607 for inverting an output of the delay unit 606.

Figures 3, 4A:
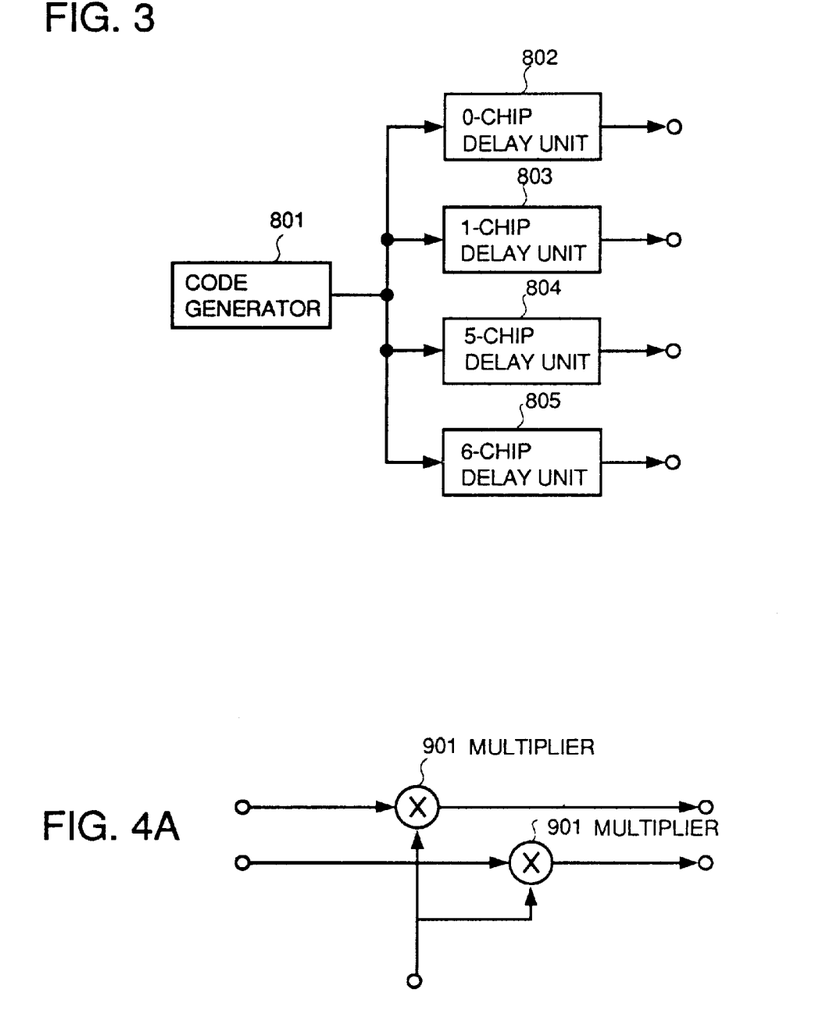
FIG. 3 is a block diagram of a code generator 102.
FIG. 4A shows a function of a spread device 103.

The code generator 102 is described in detail. FIG. 3 is a block diagram of the code generator 102. The code generator 102 of this embodiment comprises a code generator 801 for outputting the 11-bit Barker code at a chip rate of 11 MHz, 0-chip delay unit 802, 1-chip delay unit 803, 5-chip delay unit 804 and 6-chip delay unit 805 for outputting a signal obtained by delaying and outputting the code which has been generated and output through the code generator 801, respectively. The code generator 102 generates a clock signal CK1 at a bit rate of 6 Mbps synchronized with the chip rate of the code generator 801 and generates a clock signal CK2 obtained by dividing the clock signal CK1 into 6. The code generator 102 further generates a clock signal CK3 1-chip delayed from the clock signal CK2, a clock signal CK4 5-chip delayed from the clock signal CK2 and a clock signal CK5 6-chip delayed from the clock signal CK2. Those clock signals CK1 to CK5 are output to the signal distributor 101 and the selector 104. Each output from the respective delay units 802 to 805 is output at the respective clock signal timing of CK2 to CK5.

Figure 4B:
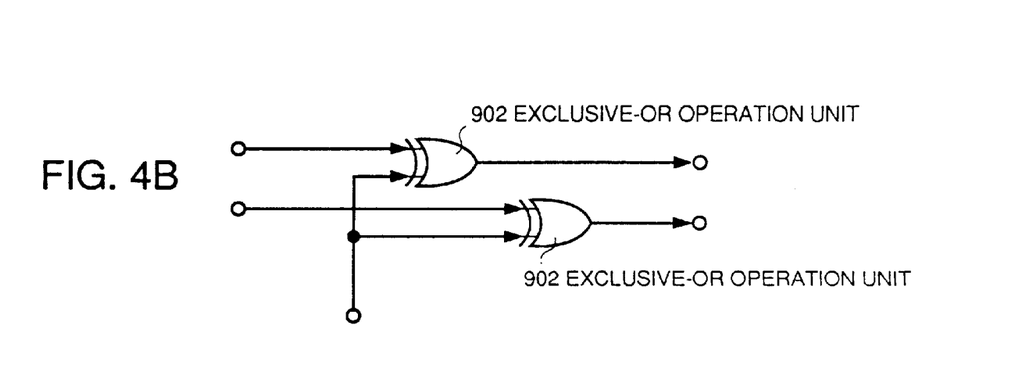
FIG. 4B shows a construction of the spread device 103.

The spread devices 103a to 103d are described in detail. FIG. 4A shows each function of the spread devices 103a to 103d. FIG. 4B shows each construction of the spread devices 103a to 103d. Each of the spread devices 103a to 103d comprises two multipliers 901 to which a data signal formed of 1-bit (either "0" or "1") binary signal and a Barker code are input. The multiplier 901 further comprises EXCLUSIVE-OR operation units 902 as shown in FIG. 4B.

Figure 5:
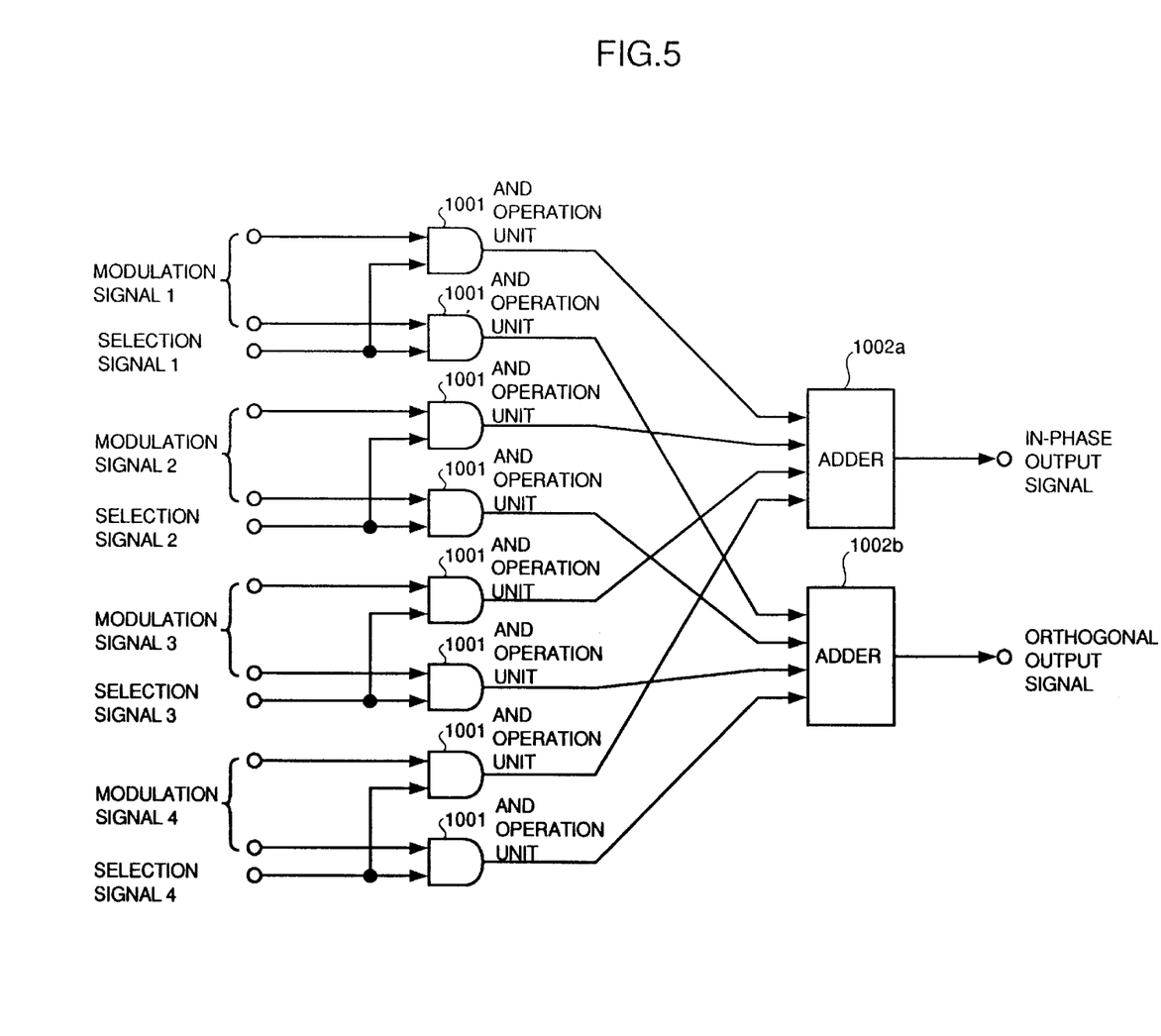
FIG. 5 is a block diagram of a selector 104.

The selector 104 is described in detail. FIG. 5 is a block diagram of the selector 104. The selector 104 of this embodiment comprises AND operation units 1001 for obtaining AND of the modulation signal and the selection signal, adder 1002a for outputting an in-phase output signal by adding the signal output from the AND operation unit 1001 and another adder 1002b for outputting a quadrature output signal.

Figure 6:
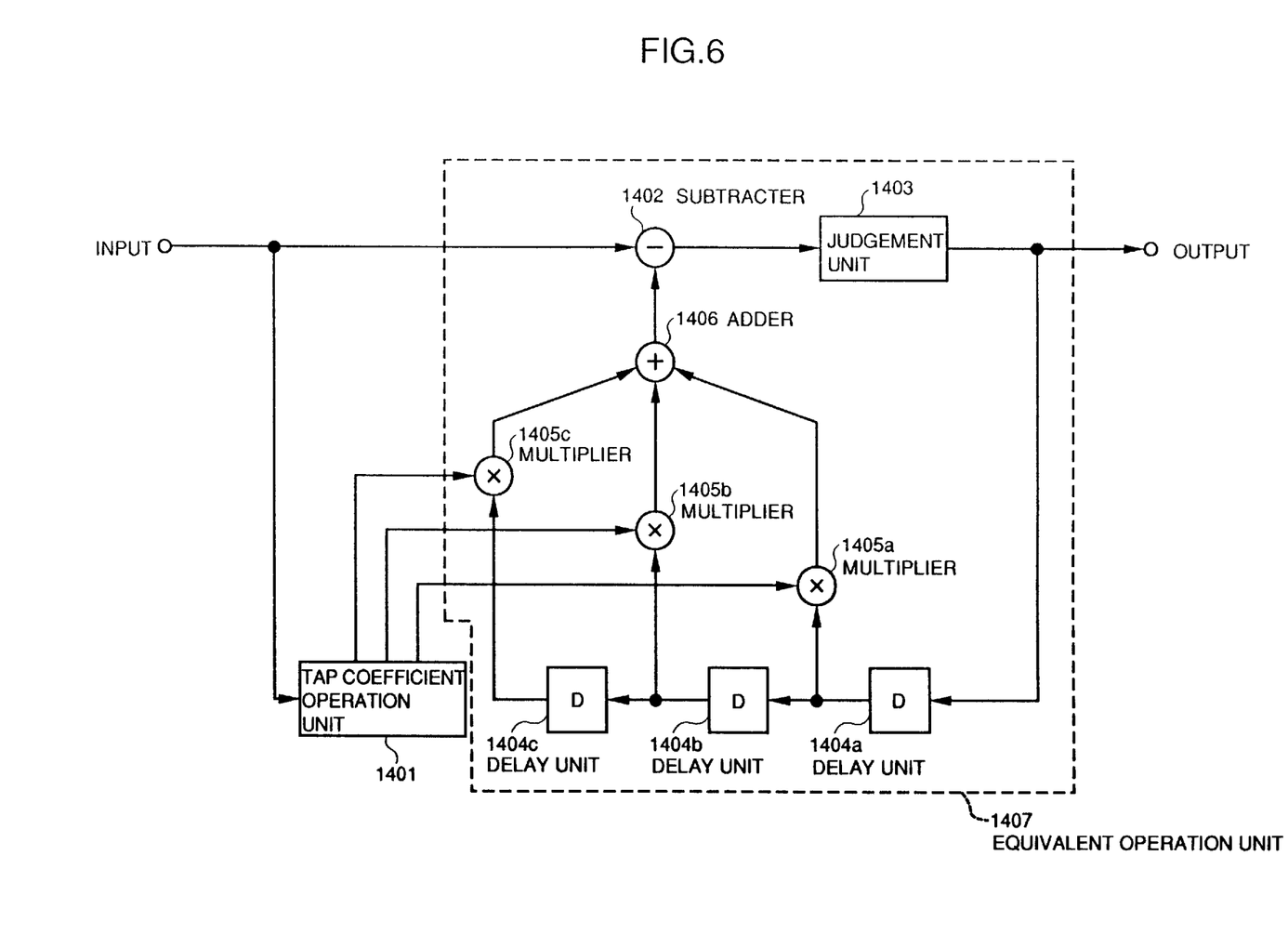
FIG. 6 is a block diagram of an equalizer 113.

The equalizer 113 is described in detail. FIG. 6 is a block diagram of the equalizer 113. The equalizer 113 comprises a tap coefficient operation unit 1401 for obtaining a tap coefficient as a value equalizing to the delay distortion size and an equalizing operation unit 1407 for removing the delay distortion from the input signal. The equalizing operation unit 1407 further comprises a subtractor 1402, a decision unit 1403 for judging whether or not the delay distortion is carried by the input signal, delay units 1404a to 1404c for delaying the signal that has been judged to have the delay distortion by the decision unit 1403, multipliers 1405a to 1405c for multiplying the tap coefficient by each output of the delay units 1404a to 1404c and an adder 1406 for adding each output of the multipliers 1405a to 1405c, respectively. The equalizing operation unit 1407 forms the decision feedback type equalizer.

Next, communication operation in the above-constructed code division multiplexing communication system is described. It is assumed that in the above code division multiplexing communication system, the number of code division multiplexing is set to 2, the combination of multiplication has 4 variations, modulation mode is set to QPSK at a symbol rate of 1MHz and the 11-bit Barker code is used as a spread code. The total transmission bit rate is set to 6 Mbps.

Figure 7:
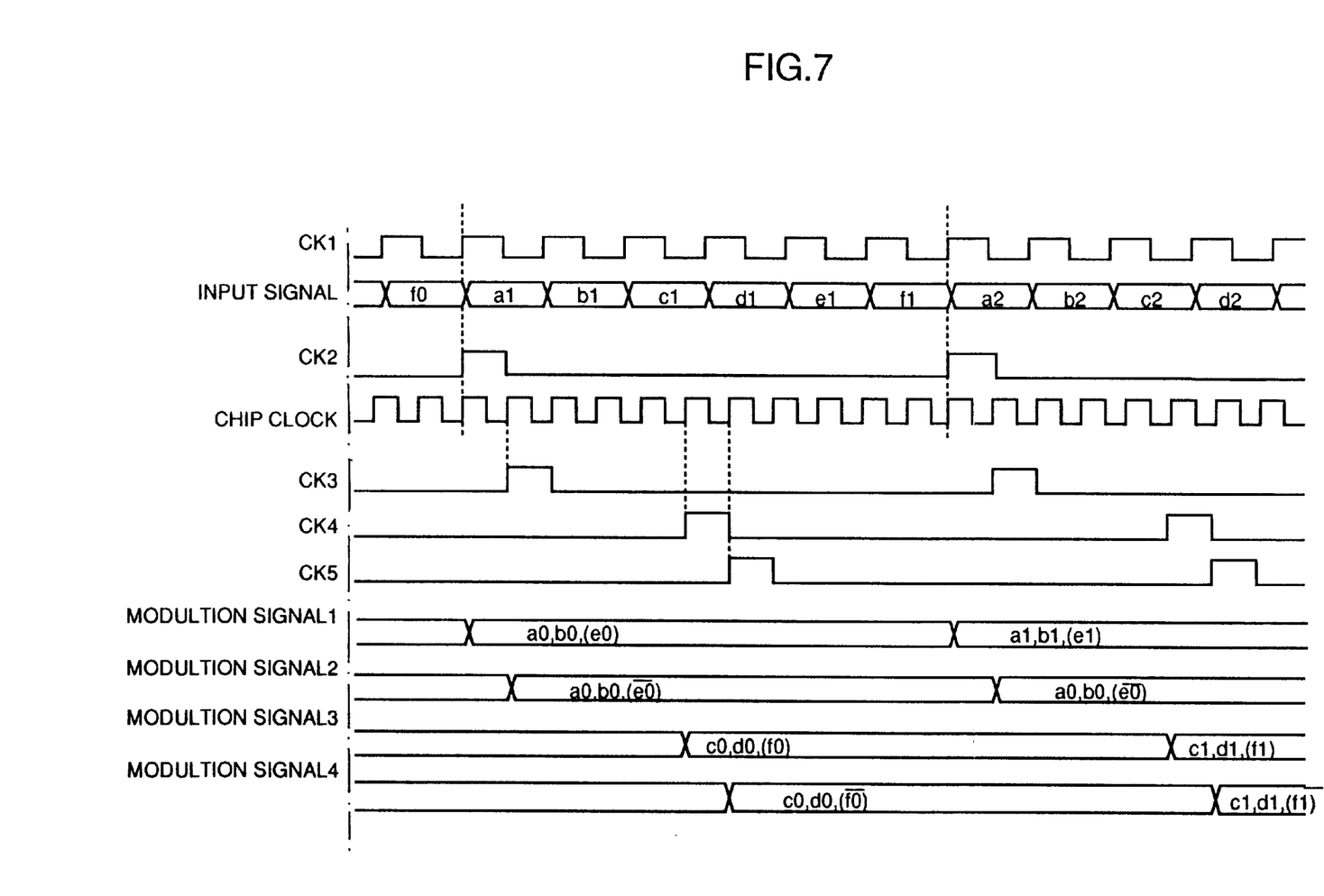
FIG. 7 is a timing chart of an input/output signal of the signal distributor 101.

First, a serial signal at 6 Mbps transmission bit rate is input to the signal distributor 101 via a terminal 108. FIG. 7 is a timing chart showing an input/output timing in the signal distributor 101 shown in FIG. 2.

After the serial signal at 6 Mbps transmission bit rate is input, the serial data are input to the delay unit 601 at a rise timing of the clock signal CK1.

Then the output signal of the delay unit 601 is input to the delay unit 602 at a rise timing of the clock signal CK2.

The input serial signal, thus, is input as 6-bit parallel signals (a1, b1, c1, d1, e1 and f1) at a symbol rate of 1 MHz from the delay unit 602. As for the timing order of the signal, the signal a1 is input first and the signal f1 is input lastly.

The first 2 bits (a1 and b1) of the 6-bit parallel signals output from the delay unit 602 are output as a data signal 1 synchronized with rising of the clock signal CK2 and as a data signal 2 synchronized with rising of the clock signal CK3, respectively.

The second 2 bits (c1 and d1) of the 6 bit parallel signals output from the delay unit 602 are output as a data signal 3 synchronized with rising of the clock signal CK3 and as a data signal 4 synchronized with rising of the clock signal CK5, respectively.

The last 2 bits (e1 and f1) of the 6 bit parallel signals output from the delay unit 602 become selection signals that select the signal to be output among those data signals 1 to 4.

The data signals are distributed and each of the distributed data signals is input to the spread devices 103a to 103d, respectively, while the selection signals are input to the selecter 104.

In the spread devices 103a to 103d, the data signal distributed by the signal distributor 101 is multiplied by the Barker code as the spread code generated by the code generator 102. The multiplication result is sent to the selecter 104.

The spread data signal and the selection signal are operated by the AND operation unit 1001 as shown in FIG. 7. When the signal e1 is "0", the selection signal 2 as an output of the inverter 604 becomes "1". So the spread data signal 2 is selected. When the signal e1 is "1", the selection signal 1 becomes "1". So the spread data signal 1 is selected. When the signal f1 is "0", the selection signal 4 as an output of the inverter 607 becomes "1". So the spread data signal 4 is selected. When the signal f1 is "1", the selection signal 3 becomes "1". So the spread data signal 3 is selected.

Each operation result is added in the adder 1002a and the adder 1002b.

Both a component and c component contained in the spread data signal are output as in-phase output signals. Both b component and d component are output as quadrature output signals.

Upon outputting the spread data signal selected by the selector 104, the modulator 105 quadrature modulates the chip rate at 11 MHz to the spread data signal.

Figure 8A:
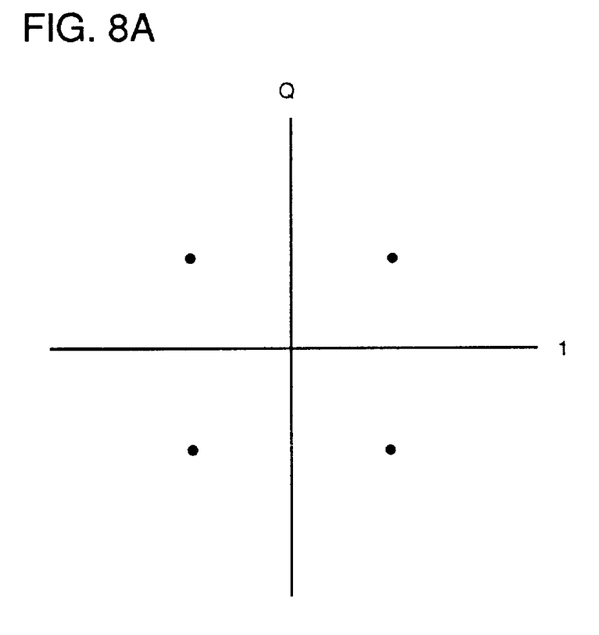
FIGS. 8A and 8B show an output signal of a modulator 105 in a 2 dimensional manner of an output signal.
Figure 8B:
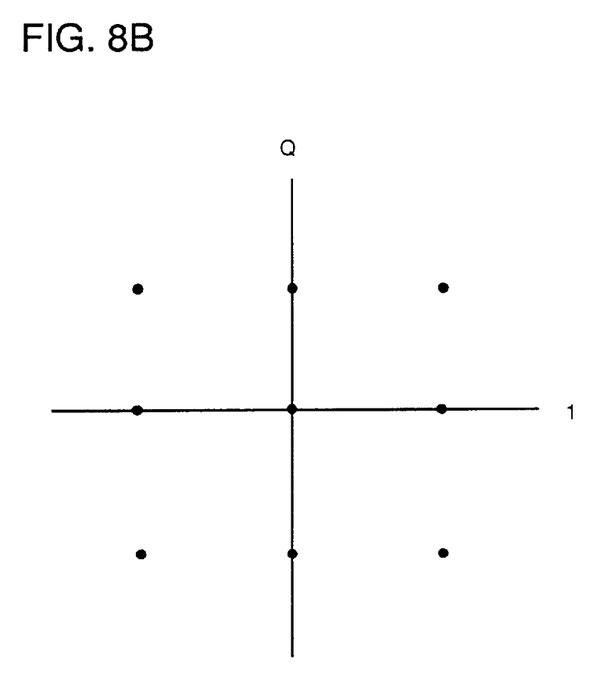

FIGS. 8A and 8B graphically show an output signal in the modulator 105 shown in FIG. 1 in a 2 dimensional manner. More specifically FIG. 8A shows an output signal in case the number of multiplexing is 1. FIG. 8B shows an output signal in case the number of multiplexing is 2.

As FIG. 8A shows, when the number of multiplex is 1, 4 signal points are arranged. As FIG. 8B shows, when the number of multiplex is 2 similar to this embodiment, 9 signal points are arranged.

Upon modulation by the modulator 105, the frequency of the modulation signal which has been modulated is converted into a radio frequency through the analog operation unit 106.

Then the modulation signal having the radio frequency is amplified, which is output to the receiver 110 via the terminal 107.

When the modulation signal output from the transmitter 100 is received at the terminal 118 of the receiver 110, the received signal is amplified in the analog operation unit 11, which is converted into a base band signal. The correlator 112 then take a correlation between the Barker code multiplied by the modulation signal and the Barker code at a timing in the code generator 102.

The construction of the correlator 112 is identical to that shown in FIG. 13.

Figure 9A:
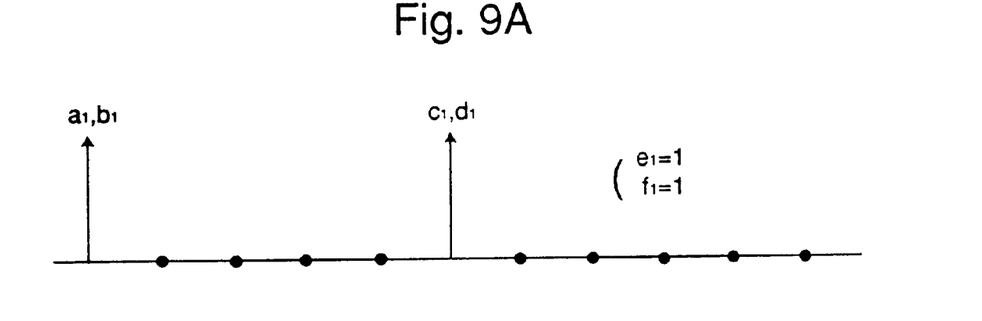
FIGS. 9A to 9D graphically show each autocorrelation value of a signal received by a receiver.
Figure 9B:
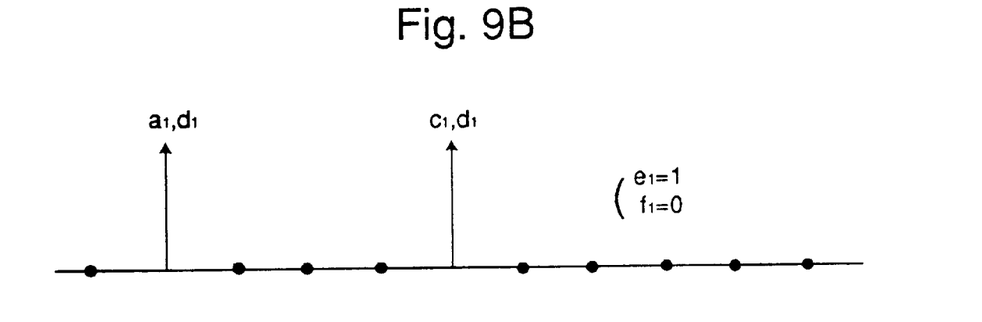
Figure 9C:
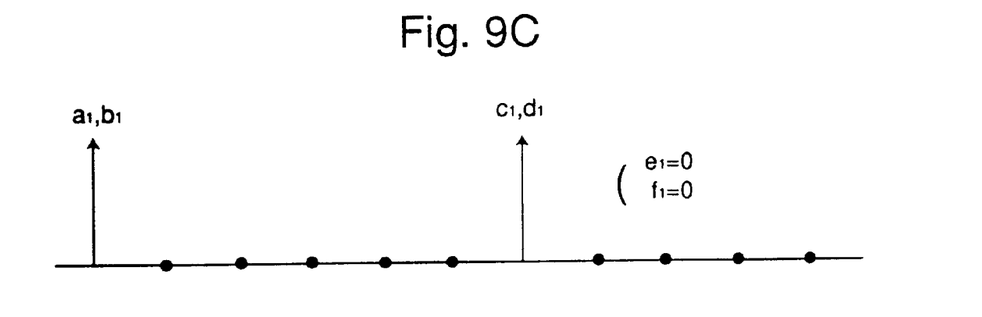
Figure 9D:
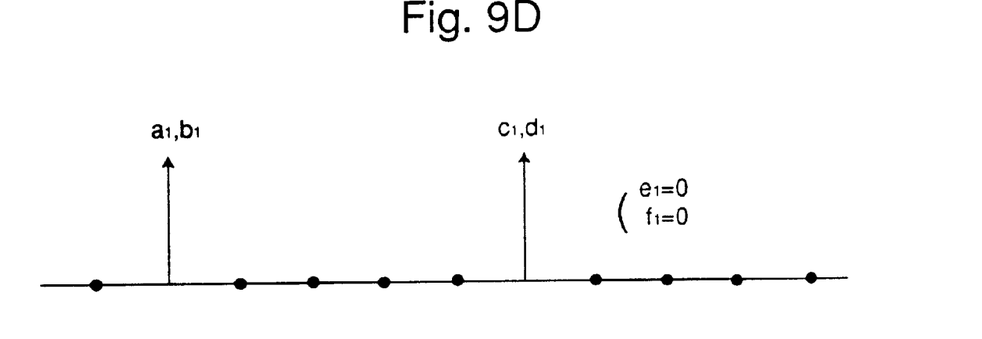

FIGS. 9A to 9D show each of autocorrelation value of the signal received by the receiver, respectively. FIG. 9A shows a spread timing in case the signal e1=1 and signal f1=1. FIG. 9B shows a spread timing in case the signal e1=0 and f1=1. FIG. 9C shows a spread timing in case the signal e1=1 and f1=0. FIG. 9D shows a spread timing in case the signal e1=0 and f1=0. If no distortion exists on the signal transmission path, the signal output from the correlator 112 falls into either state shown in FIGS. 9A to 9D.

When e1=1 and f1=1, signals (a1, b1) 0-chip delayed and signals (c1, d1) 5-chip delayed are received as shown in FIG. 9A.

When e1=0 and f1=1, signals (a1, b1) 1-chip delayed and signals (c1, d1) 5-chip delayed are received as shown in FIG. 9B.

When e1=1 and f1=0, signals (a1, b1) 0-chip delayed and signals (c1, d1) 6-chip delayed are received as shown in FIG. 9C.

When e1=0 and f1=0, signals (a1, b1) 1-chip delayed and signals (c1, d1) 6-chip delayed are received as shown in FIG. 9D.

Figure 10A:
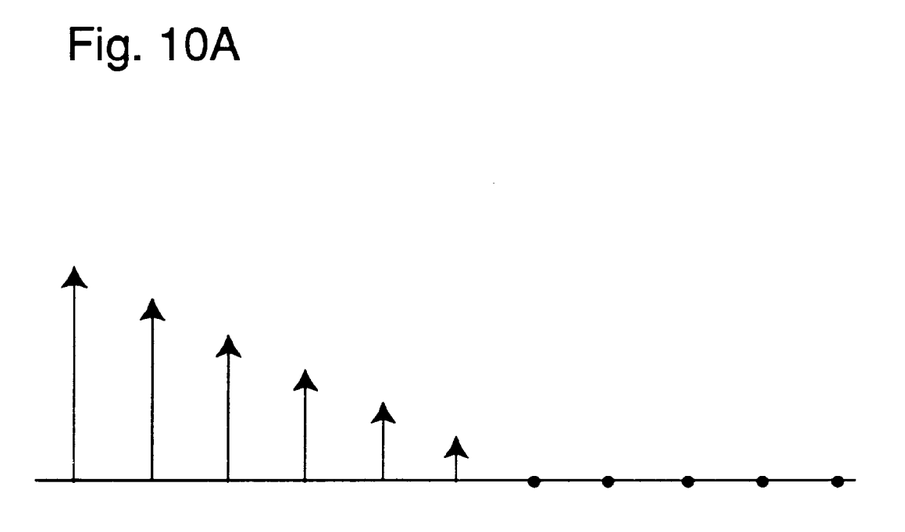
FIGS. 10A and 10B graphically show each autocorrelation value of a reception signal carrying a delay distortion.
Figure 10B:
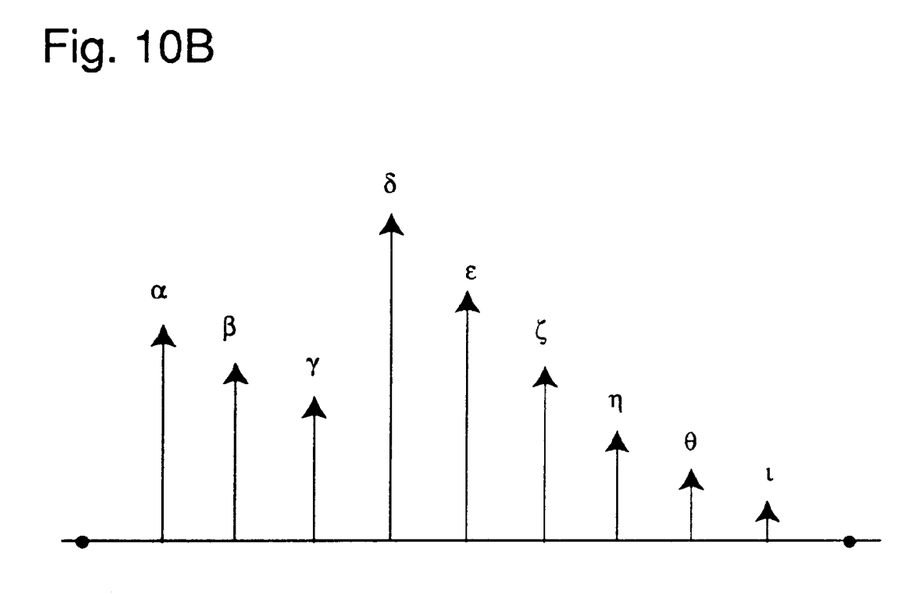

FIGS. 10A and 10B graphically show each autocorrelation value accompanied by the delay distortion. FIG. 10A graphically shows a correlation value in case the number of multiplexing is 1. FIG. 10B graphically shows a correlation value in case the number of multiplexing is 2. If the signal transmission path has the delay distortion due to multipath, the correlation values as shown in FIGS. 10A and 10b are obtained.

Supposing that the number of multiplexing is 1 as FIGS. 10A and 10B show, spectrum spread can isolate the delay distortion irrespective of the multipath, resulting in preventing deterioration of the reception characteristics. Assuming that the number of multiplexing is 2 similar to this embodiment, as the delay signals are overlapped with each other, those delay signals cannot be isolated. In case of detecting the signal location by identifying the amplification level when the signals locate at α and δ positions, the signals are mis-judged to locate at α and εpositions, resulting in deteriorated reception characteristics.

In order to eliminate the influence of the delay distortion when the number of multiplexing is 2 or more, the equalizer 113 is used.

Upon outputting the modulation signal based on the correlation result, the correlator 112 judges whether or not the signal input to the decision unit 1403 (See FIG. 6) in the equalizer 113 has the delay distortion. Then the signal which has been judged to have the delay distortion through the decision unit 1403 is input to the delay units 1404a to 1404c and then delayed. The delayed signal is multiplied by the tap coefficient which has been generated by the tap coefficient operation unit 1401 (See FIG. 6) through the multipliers 1405a to 1405c. The adder 1406 (See FIG. 6) adds each signal multiplied in the respective multipliers 1405a to 1405c, which is restored as a replica signal. The replica signal is removed by the subtractor 1402 (See FIG. 6) to eliminate the delay distortion. The resultant signal carrying no distortion is input to the decision unit 1403.

The delay distortion size has to be recognized in advance so as to fix each tap coefficient value of the multipliers 1405a to 1405c required for generating the replica signal.

Figure 11:
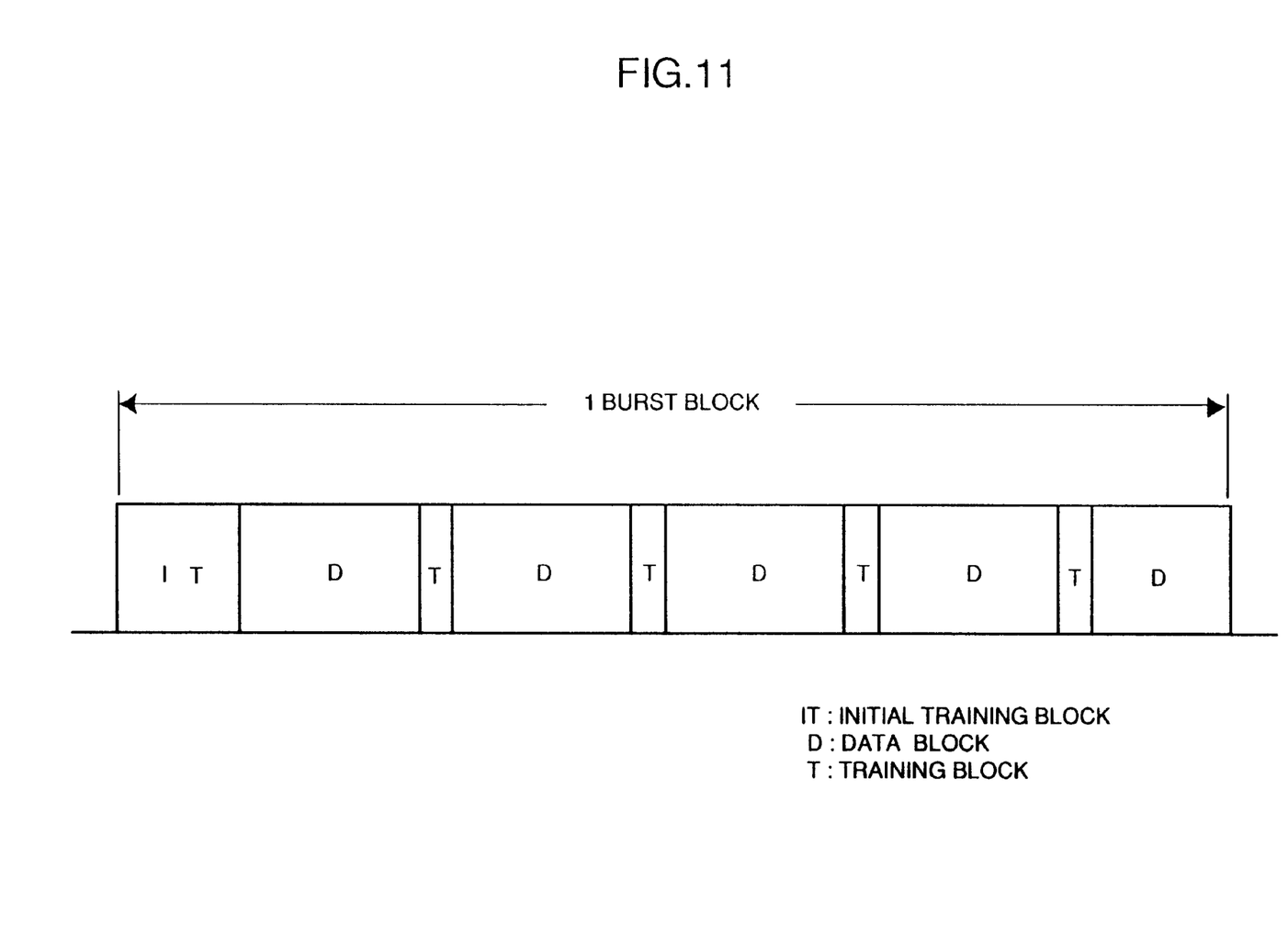
FIG. 11 shows one construction example of a reception burst signal.

FIG. 11 is a construction example of a reception burst signal.

As FIG. 11 shows, a training signal is sent to obtain a tap coefficient before transmitting the modulation signal. When the number of multiplexing is set to 1, each multipath can be isolated irrespective of the delay distortion as shown in FIG. 10A. Therefore an average value of the multipath time is obtained and stored in a memory. The above-described operations are served by the tap coefficient operation unit 1401.

The delay distortion characteristics are gradually changing during transmission of the modulation signal. The training signal is inserted as shown in FIG. 11 so that the tap coefficient is adjusted to keep an optimum value constantly.

When the delay distortion of the modulation signal is removed by the equalizer 113, those signals having the delay distortion reduced become 2 signals at the highest levels within 1 symbol block. The signal location detector 114 detects locations of those 2 signals, providing 2-bit information. When the signal location is identified by the signal location detector 114, the signals at identified locations are demodulated by the demodulator 115 to provide 2-bit information. Therefore 4-bit information is provided by 2 demodulators 115 in total.

The 2-bit information derived from the signal location detector 114 and 4-bit information derived from 2 demodulators 115 are converted into 6-bit signal by the coupler, that is output as a serial signal.

Then the terminal 117 outputs a serial data at 6 Mbps transmission bit rate. In this embodiment, it is assumed that 11-bit spread code is used and the combination of multiplexing location has 4 variations. However, such combination can be allowed to have maximum of 55 variations. For example, data transmission at 9 Mbps can be realized by transmitting 32 variations of those combinations as the location information. Additionally the 13-bit Barker code further allows for the transmission at maximum of 10 Mbps in spite of 2 multiplexings.

The above-constructed present invention, thus, presents the following advantageous effects:

(1) A code generator is provided to produce a plurality of codes, each at a differently shifted timing from a spread code. Those codes are used for the code division multiplexing, by which the communication with larger capacity is realized.

(2) Using the Barker code with excellent autocorrelation characteristics allows for code division multiplexing exhibiting high transmission characteristics.

(3) The information on the relative timing location of signals is considered for multiplexing, thus further expanding the transmission capacity.

(4) The equalizer for removing the delay distortion of the signal generated on the transmission path of the receiver is provided. The influence of the delay distortion generated on the transmission path on the communication operation can be removed by using a plurality of codes, each at a differently shifted timing from a spread code.

The above advantageous points (1) to (4) allow for spectrum spread communication at an increased transmission rate twice or further higher than the conventional rate yet at the same spectrum spread ratio and in the same frequency band width.

The present invention has been described in relation to particular embodiments thereof. Many other variations, modifications, and other uses will become apparent to those skilled in the art. Accordingly, the invention is to be limited not by the disclosure herein, but only by the appended claims.

What is claimed is:

1. A code division multiplexing communication system having a transmitter and a receiver using spectrum spread for transmitting a digital signal between said transmitter and said receiver wherein said transmitter comprises:
signal distribution means for dividing (k+n×m)-bit serial input signal per symbol timing to n pieces of m bit parallel signals, wherein each k,m is at least 1, and n is a least 2, and outputting j variations of m bit data signals each at a differently-shifted timing from said parallel signals and j selection signals for selecting said m bit data signals, wherein;
code generation means for generating j spread codes each at a differently shifted timing;
j units of spread means for spectrum spreading said m bit data signals based on said spread codes;
selection means for selecting and synthesizing n signals among output signals of said spread means based on said selection signals;
modulation means for modulating an output signal of said selection means; and
analog operation means for converting a frequency of an output signal of said modulation means into a radio frequency and transmitting a signal at a changed frequency to said receiver; and said receiver comprises:
analog operation means for converting a signal transmitted from said transmitter into a base band signal;
correlation means for taking a correlation between an output signal of said analog operation means and a spread code and outputting a correlation result signal;
equalizing means for removing a delay distortion generated on a transmission path from said correlation result signal;
signal location detection means for detecting timing locations of n signals at the highest level with 1 symbol block and extracting k-bit information from said timing location;
n units of demodulation means for demodulating (n×m)-bit signal based on an output signal of said equalizing means and signal location information in said signal location detection means; and
coupler means for coupling output signals of said n units of demodulation means and an output signal of said signal location detector and outputting (k+n×m)-bit serial signal per symbol.

2. The code division multiplexing communication system of claim 1, wherein said spread means comprises means for spectrum spreading a data signal based on a Barker code; said correlation means comprises means for taking a correlation between an output signal of said analog operation means and a Barker code and outputting a signal based on a correlation result.

3. The code division multiplexing communication system of claim 1, wherein said equalizing means comprises equalizing operation means for removing a delay distortion from an output signal of said correlation means for equalization and tap coefficient operation means for obtaining a multipath distortion based on an output signal of said correlation means and outputting said multipath distortion as a tap coefficient of said equalizing operation means.

4. A code division multiplexing communication method for transmitting and receiving a digital signal through spectrum spread, wherein a transmission side comprising the steps of:
dividing (k+n×m) bit serial input signal per symbol timing to n pieces of m bit parallel signals, wherein each k,m is at least 1 integer, and n is at least 2, and outputting j variations of m bit data signals each at a differently-shifted timing from said parallel signals and j selection signals for selecting said m bit data signals, wherein j is an integer also $_jC_n \geq 2^k$;
generating j spread codes each at a differently shifted timing;
generating j spectrum spread signals based on said m bit data signals and said spread codes;
selecting and synthesizing n signals among said j spectrum spread signals based on said selection signals;
modulating said selected and synthesized signal; and
converting a frequency of said modulated signal into a radio frequency; and a reception side comprising the steps of:
receiving a signal at a changed frequency and converting said reception signal into a base band signal;
taking a correlation between said base band signal and said spread codes for outputting a signal based on a correlation result;
equalizing a signal based on said correlation result and removing a delay distortion generated on a transmission path from a signal based on said correlation result and outputting a signal carrying no delay;
detecting timing locations of n signals at the highest level within 1 symbol block and extracting k-bit information from said timing location;

demodulating (n×m)-bit signal based on a signal with said delay distortion removed and detected timing location of n signals; and coupling said extracted k-bit information with said demodulated (n×m)-bit signal for generating (k+n×m)-bit serial signal per symbol.

5. The code division multiplexing communication method of claim 4, wherein said spread code is a Barker code.

6. The code division multiplexing communication method of claim 4, wherein said step for equalizing a signal based on said correlation result further comprises steps of:

obtaining a multipath distortion from a signal based on said correlation result and obtaining a tap coefficient for said equalization of said multipath distortion when receiving a training signal; and equalizing a signal based on a correlation result with said obtained tap coefficient and removing a delay distortion from a signal based on said correlation result when receiving a data signal.

7. A code division multiplexing communication system having a transmitter and a receiver using spectrum spread for transmitting a digital signal between said transmitter and said receiver wherein said transmitter comprises:

a signal distributor dividing (k+n×m)-bit serial input signal per symbol timing to n pieces of m bit parallel signals, wherein each k,m is at least 1, and n is a least 2, and outputting j variations of m bit data signals each at a differently-shifted timing from said parallel signals and j selection signals for selecting said m bit data signals, wherein j is an integer also $_jC_n \geq 2^k$;

a code generator generating j spread codes each at a differently shifted timing;

j units of spread devices spectrum spreading said data signals based on said spread codes;

a selector selecting and synthesizing n signals among output signals of said spread means based on said selection signals;

a modulator modulating an output signal of said selection means; and a transmitter analog operation unit converting a frequency of an output signal of said modulation means into a radio frequency and transmitting a signal at a changed frequency to said receiver; and said receiver comprises:

a receiver analog operation unit converting a signal transmitted from said transmitter into a base band signal;

a correlator taking a correlation between an output signal of said analog operation means and a spread code and outputting a correlation result signal;

an equalizer removing a delay distortion generated on a transmission path from said correlation result signal;

a signal location detector detecting timing locations of n signals at the highest level with 1 symbol block and extracting k-bit information from said timing location;

n units of demodulators demodulating (n×m)-bit signal based on an output signal of said equalizer and signal location information in said signal location detector; and a coupler coupling output signals of said n units of demodulation means and an output signal of said signal location detector and outputting (k+n×m)-bit serial signal per symbol.

8. The code division multiplexing communication system of claim 7, wherein said spread devices comprise devices spectrum spreading a data signal based on a Barker code; and said correlator comprises a device taking a correlation between an output signal of said transmitter analog operator and a Barker code and outputting a signal based on a correlation result.

9. The code division multiplexing communication system of claim 7, wherein said equalizer comprises an equalizing operator removing delay distortion from an output signal of said correlator and a tap coefficient operator obtaining a multipath distortion based on an output signal of said correlator and outputting said multipath distortion as a tap coefficient of said equalizer.

* * * * *